March 11, 1969    J. T. BEEBE ET AL    3,431,959
LOCKNUTS

Filed March 20, 1967

INVENTORS
JERRY T. BEEBE
O PAUL DE LOE

BY Hauke, Kraus, & Gifford
ATTORNEYS

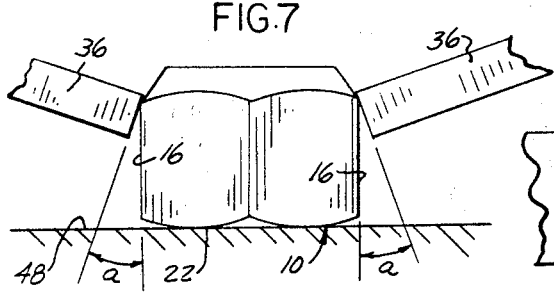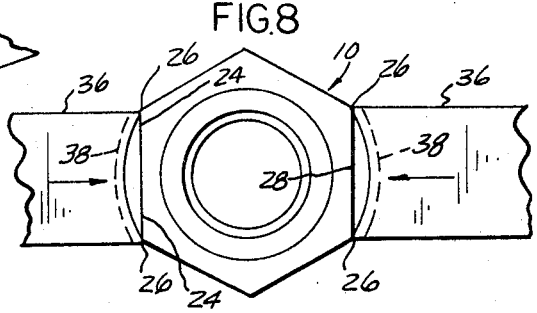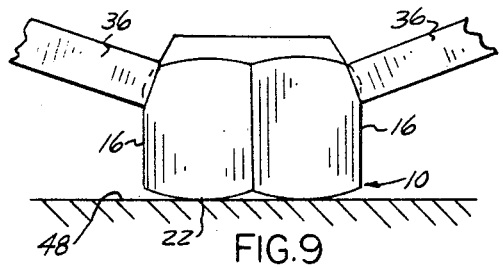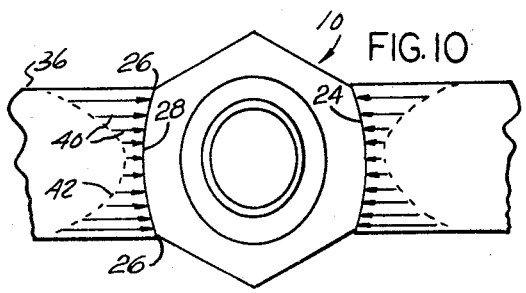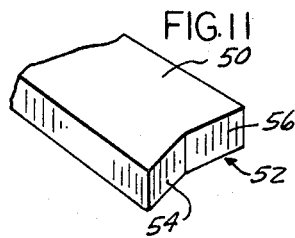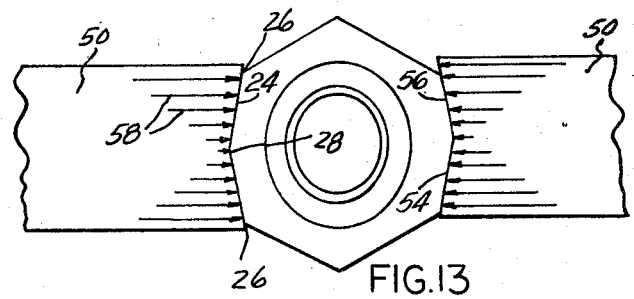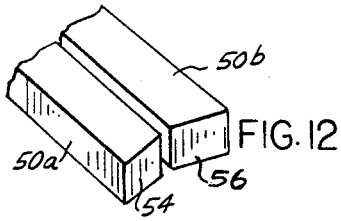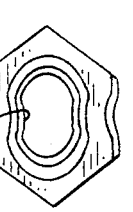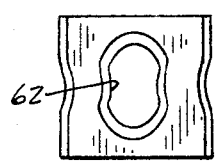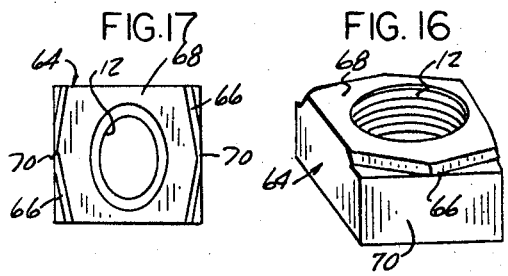

United States Patent Office 3,431,959
Patented Mar. 11, 1969

3,431,959
LOCKNUTS
Jerry T. Beebe, Grosse Pointe, and O. Paul De Loe, Detroit, Mich., assignors to Towne Robinson Fastener Company, Dearborn, Mich., a corporation of Michigan
Filed Mar. 20, 1967, Ser. No. 624,262
U.S. Cl. 151—21                    10 Claims
Int. Cl. F16b 39/28, 39/02; B21d 53/20

ABSTRACT OF THE DISCLOSURE

Prevailing torque-type locknuts made by impacting the body of conventional nuts proximate one end thereof and on two opposite sides of the body with greater impact force at the edge corners of the sides than at the center; and methods of making such locknuts by impacting with tools having a predetermined end face shape and impacting the nuts on such two opposed sides preferably at an angle to the longitudinal axis of the nuts.

Background of the invention

This invention relates to prevailing torque-type locknuts made by compressing and permanently deforming the threaded bore of a conventional nut so as to provide a locking spring action when mated with the threaded portion of an appropriate bolt.

Such locknuts are made by compressing nuts made to commercial dimensions and tolerances by impacting two opposed faces of the nuts at the edge proximate one end thereof for distorting the threaded bore of the nuts to a noncircular shape, in cross-section, at such end so as to provide a prevailing torque or locking spring when the locknuts are mated with commercial bolts. Such prior art locknuts have many disadvantages and inconveniences.

A locknut made according to the prior art mates poorly with a bolt because when the nut body is compressed on two opposed sides proximate one end thereof the nut body tends to distort over its entire length such that the whole length of the threaded bore is distored. Corners of the sides where impacted tend to protrude, and standard socket wrenches cannot properly fit the locknut. Because the nut body is distorted over its entire length, there result excessive high prevailing torques when a nut is driven over a bolt that may cause freezing or galling on the bolt. The nuts so made are difficult to start on a bolt, their bore is not distorted to a true elliptical shape in cross section and they tend to cross-thread the bolt and to break or strip the bolt threads.

Summary of the invention

The principal object of the present invention, consequently, is to provide locknuts of the character indicated which overcomes the disadvantages of the prior locknuts. Such disadvantages are overcome by precisely compressing nut blanks at the edge of two opposed sides proximate one end of the nut with impacting tools having each an end face shaped so as to provide greater compression forces at the corner of the sides than at the center of the edge thereof, and preferably impacting the side surfaces at an angle, the apex of the angle being directed towards the end of the nut threaded bore which is sought to be left at its original circular shape in cross section.

Another object of the present invention, consequently, is to provide a locknut having a threaded bore substantially circular at one end and substantially elliptical at the other end thereof.

Other objects and advantages of the present invention are to provide locknuts of the character indicated which may be made from commercially available nut blanks, which provide a substantially constant prevailing torque on corresponding commercial tolerance bolts irrespective of pitch diameters and thread deviations, which provide consistent clamp loads on bolts, which do not break or strip the threads of the bolts, which are easy to start on the bolts, and which will not freeze or gall when tightened with power wrenches, which are readily adapted to automatic feeding and which fit standard socket wrenches.

These and other objects and advantages of the invention will become readily apparent when the description of a few examples of embodiments thereof and of preferred methods of manufacturing locknuts according to the invention is read in conjunction with the accompanying drawings wherein:

Brief description of the drawings

FIG. 7 is a schematic elevational view of a modification of the method of FIG. 6;

FIG. 8 is a top plan view of the method illustrated in FIG. 7;

FIG. 9 is a view similar to FIG. 7 but showing the nut blank in the process of being impacted by the impacting tools;

FIG. 10 is a top plan view of the nut blank in the process of being impacted by the impacting tools;

FIG. 11 is a schematic perspective view of a modification of an impacting tool end face shape;

FIG. 12 is a schematic perspective view of a further modification of an impacting tool;

FIG. 13 is a top plan view of a nut blank in the process of being impacted by the impacting tools of FIG. 11;

FIG. 14 is an end plan view of a hexagonal locknut according to the prior art;

FIG. 15 is an end plan view of a square locknut according to the prior art;

FIG. 16 is a perspective view of an example of a square locknut according to the present invention; and FIG. 17 is an end view of the locknut of FIG. 16.

Description of the preferred embodiments

Figure 1:
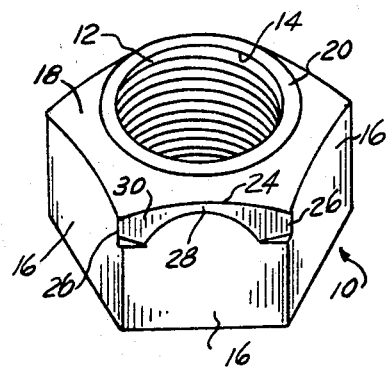
FIG. 1 is a perspective view of an example of locknut according to the present invention.

Referring first to FIGS. 1-5, an example of locknuts according to the present invention comprises a nut blank or body 10, hexagonal in shape and having an axial longitudinal bore 12 provided with female treads 14. The nut body 10 is provided with three pairs of opposed flat sides 16 and the body is formed at one end with a truncated cone 18 tapering from the main hexagonal body to an annular surface 20 in a plane substantial normal to the axis of bore 12, a wider annular surface 22 being formed on the other end face, annular end surface 22 forming a bearing face for the locknut when torqued down upon its corresponding bolt, not shown, annular bearing face 22 engaging a surface of the parts being joined by the nut and bolt assembly.

Figure 3:
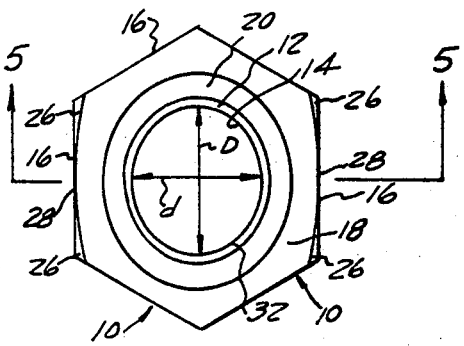
FIG. 3 is a view of one end of the locknut of FIG. 1, from line 3—3 of FIG. 2.

The above description relates to a substantially conventional hexagonal nut, and a locknut according to the invention is made by transversely compressing the nut body at one end by impacting two opposed flat sides 16, in a manner to be described hereinafter in detail, along two edges 24 proximate the annular end surface 20, with greater force directed at the corners 26 than at the center 28 thereof. The end faces of the impacting tools, as hereinafter explained in detail, form on the two opposed sides of the nut body an imprint, as shown at 30, and the tool end faces have a predetermined shape for causing a distribution of the forces of impact or pressure such that the end of the bore 12 proximate annular end surface 20 is distorted substantially according to an ellipse 32 of major diameter D and minor diameter d, as best shown in FIG. 3. The other end of the threaded bore 12, proximate the wide annular bearing end surface 20, is left substantially undisturbed such that the threaded bore 12 remains substantially circular as shown at 34 in FIG. 4.

Figure 4:
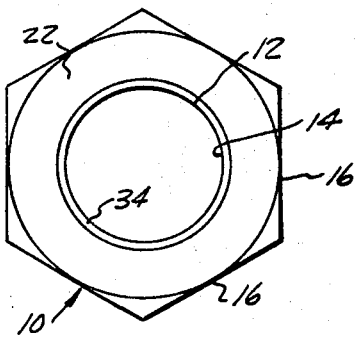
FIG. 4 is a view of the other end of the locknut of FIG. 1, from line 4—4 of FIG. 2.
Figure 5:
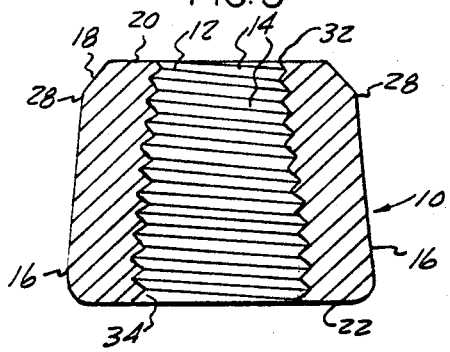
FIG. 5 is a longitudinal sectional view from line 5—5 of FIG. 3.

As shown in FIGS. 3 and 4, and particularly in FIG. 5, the internally threaded bore 12 of the locknut varies from a substantially circular shaped cross section at 34 to a substantially elliptical cross section at 32 from the end proximate annular bearing end surface 22 to the end proximate annular surface 20, such that the threaded bore 12, as best shown in FIG. 5 in an exaggerated manner, when seen in a longitudinal section substantially along the minor diameter d of the elliptical portion 32 is substantially frusto-conical with its apex directed to the top of the drawing. In order to provide for correct start of the nut upon the thread of a corresponding bolt, about two complete threads proximate the end provided with bearing annular surface 22 are left undistorted and substantially circular in cross-section. This results from the method of deforming the nut body with appropriate impact tools in the manner presently explained in detail.

Figure 6:
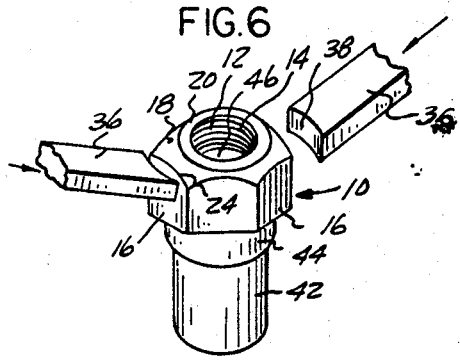
FIG. 6 is a schematic perspective view of a method utilized for making a locknut according to the present invention.

Referring now to FIG. 6, a locknut according to the present invention is produced by impacting the body 10 of a conventional commercial nut along the edges of two opposed sides 16 proximate the truncated cone portion 18 of the nut blank, by means of a pair of impacting tools 36 power driven in the direction of the arrows by any appropriate means such as, for example, fluid operated pistons, not shown. The impacting tools 36 are symmetrically disposed with respect to the longitudinal axis of the nut blank and are supported by appropriate guide rail slides, not shown, with the longitudinal axis of the impacting tools forming an angle relatively to each other, the apex of the angle being substantially at the axis of the nut threaded bore 12. The end faces 38 of the tools have a concave arcuate shape, such that the tools are impacting the corners 26, FIG. 8, of a pair of opposed sides 16 with greater force than at the center 28 of each side edge 24. In addition, with tools having an end face 38 substantially normal to the axis of motion of the tools, each end face 38 forms with the surface of the nut opposed sides an angle a, FIG. 7, comprised between zero and twenty degrees, and preferably in the neighborhood of ten degrees such that the direction of impact of each tool relatively to the longitudinal axis of the nut forms an angle of ninety to one hundred ten degrees therewith, preferably about one hundred degrees.

Figure 2:
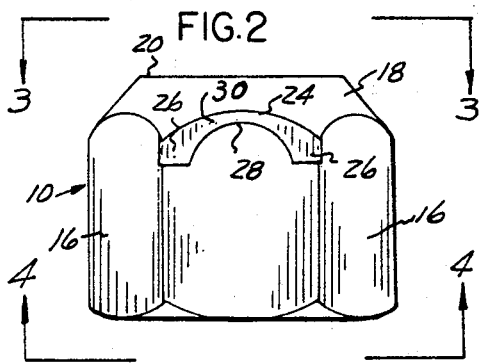
FIG. 2 is a side elevational view of the locknut of FIG. 1.

In view of the concave arcuate shape of the end faces 38 of impacting tools 36, an imprint, such as shown at 30, in FIGS. 1 and 2, is formed on opposed sides 16 of the nut, when each impacting tool has been driven with enough force such that the center of the end face 38 thereof just engages the center 28 of the edge 24 of each of the opposed sides, as shown in FIGS. 9 and 10. The distribution of impact forces along an edge 24 of each side is substantially as shown by force vectors 40 at FIG. 10, the envelope of the force vectors being substantially shaped as a parabola as shown at 42.

The nut body 10 may be supported by a mandrel, such as shown at FIG. 6 at 42, the mandrel having a shouldered portion 44 adapted to engage the bearing annular surface 22 of the nut body and being further provided with a threaded portion 44 engaged part of the way with the threaded bore 12 of the nut proximate bearing annular surface 22, thus supporting the walls of the nut blank for withstanding the deforming impact of striking tools 36, without causing any appreciable distortion of preferably the two first complete threads proximate the annular bearing end surface 22, so that the shape of the inner bore of the nut remains substantially circular at that end. However, such a mandrel is not absolutely necessary, and satisfactory results are achieved by impacting the nut blanks with the arrangement shown in FIGS. 7–10 with the annular bearing surface 22 of the nut body 10 being simply supported by engagement with a strong smooth supporting surface, as shown at 48.

The preferred method is to strike the surface of two opposed sides of the nut body with inclined tools, as shown in the drawings. However, substantially equivalent results may be obtained by impacting the nut body along the edges of opposed sides proximate one end of the body with impacting tools reciprocated in opposite directions, in a straight plane substantially at right angle to the axis of the nut longitudinal bore and having end faces forming relatively to each other an angle with its apex directed toward the end of the nut longitudinal bore which is to be compressed and deformed to a substantially elliptical shape.

Alternately, each impacting tool instead of having a concave arcuate end face, as hereinbefore described, may be of the shape shown in FIG. 11 at 50 with an end face 52 formed of two symmetrically disposed flat portions 54 and 56 forming an obtuse angle. When a nut body 10 is impacted by a pair of such tools 50—50, as shown in FIG. 13, each of opposed side edges 24 proximate the appropriate end of the nut body 10 is impacted with greater force at the two corners 26 than at the center 28 thereof, so as to cause the inner bore of the nut to be deformed substantially to an elliptical shape at such end. The diagram of the compressive force distribution is substantially as shown at 58 in FIG. 13.

Instead of using a pair of unitary tools, a pair of two separate tools, as shown at 50a and 50b in FIG. 12, may be used, each having respectively end faces 54 and 56 forming an obtuse angle with respect to each other.

Impacting conventional commercial nuts on two opposed sides along an edge proximate one end of the nut body results, as previously mentioned, in the nut internally threaded bore being deformed substantially to a true ellipse proximate said end thereof. This is due to the fact that the two corners of each edge are impacted with greater force than the center of the edge and that, consequently, the maximum compression forces are applied at a portion of the nut body having greater wall thickness. By contrast, compressing a nut body as done in the prior art by striking a conventional nut body proximate an edge of two opposed sides with impacting tools having a straight end face results in a locknut having an internal threaded bore deformed substantially as a figure eight at the end corresponding to the end where the two opposed sides are impacted along an edge, as shown in an exaggerated manner at 60 in FIG. 14. If the nut body is square in transverse section, as shown in FIG. 15, such a deformation of the end of the inner bore corresponding to the end which has been impacted is even more pronounced, as shown at 62, in view of the greater difference in wall thickness between the center of a side and the corners.

Using the method of the present invention, by utilizing for example, impacting tools with end faces shaped substantially as shown at FIG. 11, a square shaped locknut 64 may be obtained presenting impact indentations such that as shown at 66, in FIGS. 16 and 17, proximate an end face 68, at the edge of two opposed faces 70. The inner bore 12 proximate such end 68 is deformed substantially to an elliptical shape providing appropriate locking action when the nut is threaded upon a corresponding bolt.

It will be evident to those skilled in the art that various changes in details and arrangements which have herein been described and illustrated in order to explain the nature of the invention, may be made without departing from the principle and scope of the invention.

We claim:
1. In a locknut comprising a nut body having at least two pairs of equidistant opposed four-cornered flat sides, each side of a pair being substantially parallel to the other side, said nut body having a central longitudinal threaded bore extending from end to end, the improvement comprising:
 (a) said bore being of substantially circular shape in cross-section proximate one end thereof;
 (b) said bore being of substantially elliptical shape in cross-section proximate the other end thereof;
 (c) said bore progressively and uniformly varying from said circular shape to said elliptical shape from said first mentioned end to said second mentioned end; and
 (d) said bore being deformed to said substantially elliptical shape as a result of impacting two opposed sides substantially at the edge proximate said second mentioned end and with greater force at the two corners of said edge than at the center thereof by way of a pair of symmetrically disposed impacting tools having an impacting face engaging said opposed sides at an angle comprised between zero and twenty degrees with the plane of said sides and said impacting face being shaped such as to leave along said edge an imprint of a depth progressively and symmetrically decreasing from the corners of said edge to the center thereof.

2. The improvement of claim 1 wherein said opposed sides are each impacted with a tool member having a concave arcuately shaped end face.

3. The improvement of claim 1 wherein said opposed sides are each impacted with a tool member having an end face comprising a pair of plane surfaces disposed at an obtuse angle to each other.

4. The improvement of claim 1 wherein said nut body is a hexagonal body having three pairs of opposed four-cornered flat sides.

5. The improvement of claim 1 wherein said nut body is a square body having two pairs of opposed four-cornered flat sides.

6. A method for making a locknut of a conventional nut comprising a nut body having at least two pairs of equidistant opposed four-cornered flat sides, each side of a pair being substantially parallel to the other side, said nut body having a central longitudinal threaded bore having a substantially circular shape in cross-section extending from end to end, said method comprising:
 (a) impacting two opposed sides of said nut body with substantially equal force at the two corners of an edge of each side proximate one of said ends for imparting a substantially elliptical shape in cross-section to said bore at said one end, said force of impact at said corners being substantially greater than the force of impact at the center of said edge and progressively and symmetrically decreasing from said corners to said center; and
 (b) maintaining the substantially circular shape in cross-section of said bore at the other of said ends.

7. The method of claim 6 wherein said substantially circular shape in cross-section of said bore at the other of said ends is maintained by means of a mandrel disposed in said bore at said end.

8. The method of claim 6 wherein said two opposed sides of said nut body are each impacted with a tool having an end face forming an angle comprised between about zero and twenty degrees with the surface of each of said sides, the apex of said angle being directed toward said one end of said threaded bore and the direction of application of said tool being normal to said end face.

9. The method of claim 8 wherein said tool has a concave substantially arcuate end face.

10. The method of claim 8 wherein said tool has an end face comprising a pair of plane surfaces disposed at an obtuse angle to each other.

References Cited

UNITED STATES PATENTS

| 2,727,551 | 12/1955 | Rees | 10—86 |
| 2,791,787 | 5/1957 | Neuschotz | 10—86 |
| 3,301,298 | 1/1967 | Stoven | 151—21 |
| 3,311,146 | 3/1967 | Storch | 151—21 |
| 3,340,920 | 9/1967 | Johnson | 151—21 |

EDWARD C. ALLEN, *Primary Examiner.*

U.S. Cl. X.R.

10—86